United States Patent
Park et al.

(10) Patent No.: US 11,379,363 B2
(45) Date of Patent: Jul. 5, 2022

(54) CONTROLLER, MEMORY SYSTEM, AND OPERATING METHODS THEREOF

(71) Applicant: SK hynix Inc., Gyeonggi-do (KR)

(72) Inventors: Jeen Park, Gyeonggi-do (KR); Hyeong Ju Na, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 31 days.

(21) Appl. No.: 16/822,280

(22) Filed: Mar. 18, 2020

(65) Prior Publication Data
US 2021/0026767 A1    Jan. 28, 2021

(30) Foreign Application Priority Data

Jul. 25, 2019    (KR) .................... 10-2019-0090309

(51) Int. Cl.
| | |
|---|---|
| *G06F 3/06* | (2006.01) |
| *G06F 12/06* | (2006.01) |
| *G06F 12/02* | (2006.01) |
| *G06F 9/30* | (2018.01) |
| *G06F 12/12* | (2016.01) |

(52) U.S. Cl.
CPC ...... *G06F 12/0607* (2013.01); *G06F 9/30189* (2013.01); *G06F 12/0246* (2013.01); *G06F 12/0292* (2013.01); *G06F 12/12* (2013.01)

(58) Field of Classification Search
CPC ............ G06F 12/0607; G06F 8/30189; G06F 12/0246; G06F 9/30189; G06F 12/0292; G06F 12/12
See application file for complete search history.

(56) References Cited

U.S. PATENT DOCUMENTS

| | | | |
|---|---|---|---|
| 10,871,910 B1* | 12/2020 | Alrod .................. | G06F 11/076 |
| 2008/0112238 A1* | 5/2008 | Kim .................... | G11C 11/5621 365/200 |
| 2012/0047409 A1* | 2/2012 | Post ...................... | G11C 29/82 714/718 |
| 2014/0006898 A1* | 1/2014 | Sharon ................ | G06F 11/1072 714/755 |

(Continued)

FOREIGN PATENT DOCUMENTS

| | | |
|---|---|---|
| KR | 10-2015-0107197 | 9/2015 |
| KR | 10-2018-0026876 | 3/2018 |

*Primary Examiner* — Arpan P. Savla
*Assistant Examiner* — Trang K Ta
(74) *Attorney, Agent, or Firm* — IP & T Group LLP

(57) ABSTRACT

A controller, a memory system, and operating methods thereof are disclosed. A memory system includes at least one nonvolatile memory device and a controller configured to control the nonvolatile memory device. The at least one nonvolatile memory device includes a super block including a plurality of way interleaving memory blocks and each of memory cells included in the plurality of way interleaving memory blocks operates in a first mode which stores N-bit (wherein N is a natural number of 2 or more) data. The controller generates a reproduction super block by replacing at least one bad block among the plurality of way interleaving memory blocks included in the super block with a non-way interleaving spare block and sets each of memory cells included in the non-way interleaving spare block to operate in a second mode which stores M-bit (wherein M is a natural number smaller than N) data.

18 Claims, 12 Drawing Sheets

(56) References Cited

U.S. PATENT DOCUMENTS

| | | | |
|---|---|---|---|
| 2014/0369124 A1* | 12/2014 | Moon | G11C 16/16 |
| | | | 365/185.11 |
| 2015/0199149 A1* | 7/2015 | Sankaranarayanan | ..................... |
| | | | G06F 3/0611 |
| | | | 711/102 |
| 2015/0378821 A1* | 12/2015 | Manasse | G06F 11/1076 |
| | | | 714/764 |
| 2016/0041760 A1* | 2/2016 | Kuang | G11C 16/3495 |
| | | | 711/103 |
| 2017/0097869 A1* | 4/2017 | Sharon | G11C 11/5642 |
| 2017/0147246 A1* | 5/2017 | Byun | G06F 3/061 |
| 2019/0354478 A1* | 11/2019 | Kashyap | G06F 3/064 |

* cited by examiner

CONTROLLER, MEMORY SYSTEM, AND OPERATING METHODS THEREOF

CROSS-REFERENCE TO RELATED APPLICATION

The present application claims priority under 35 U.S.C. § 119(a) to Korean application number 10-2019-0090309, filed on Jul. 25, 2019, in the Korean Intellectual Property Office, which is incorporated herein by reference in its entirety.

BACKGROUND

1. Technical Field

Various embodiments generally relate to a semiconductor device, and more particularly, to a controller, a memory system including the same, and operating methods thereof.

2. Related Art

In recent years, the paradigm for computer environments changed to ubiquitous computing in which computer systems may be used anytime and anywhere. As a result, the use of portable electronic apparatuses such as mobile phones, digital cameras, and laptop computers has been increasing rapidly. Generally, portable electronic apparatuses use memory systems that employ memory devices. Memory systems may be used to store data used in the portable electronic apparatuses.

Memory systems using memory devices have no mechanical driving units and exhibit good stability and endurance, fast information access rates, and low power consumption. Such memory systems include a universal serial bus (USB) memory device, a memory card having various interfaces, a universal flash storage (UFS) device, a solid state drive (SSD), and the like.

SUMMARY

Embodiments are provided to bad block management technology capable of improving performance of a memory system.

In an embodiment of the present disclosure, a memory system may include: at least one nonvolatile memory device; and a controller configured to control the at least one nonvolatile memory device. The at least one nonvolatile memory device may include at least one super block including a plurality of way-interleaving-capable memory blocks, wherein each of memory cells in the plurality of way-interleaving-capable memory blocks operates in a first mode to store N-bit data. The controller may generate a modified super block by replacing at least one bad block among the plurality of way-interleaving-capable memory blocks in the at least one super block with a non-way-interleaving-capable spare block and set each of memory cells in the non-way-interleaving-capable spare block to operate in a second mode to store M-bit data, wherein N is a natural number of 2 or more and M is a natural number less than N.

In an embodiment of the present disclosure, an operating method of a memory system which includes at least one nonvolatile memory device and a controller configured to control the at least one nonvolatile memory device, the method may include: detecting, by the controller, at least one bad block in at least one super block including a plurality of way-interleaving-capable memory blocks; generating, by the controller, a modified super block by replacing the at least one bad block with a non-way-interleaving-capable spare block; and setting each of the memory cells in the way-interleaving-capable memory blocks to operate in a first mode to store N-bit data, and setting each of the memory cells in the non-way-interleaving-capable spare block to operate in a second mode to store M-bit data, wherein N is a natural number of 2 or more and M is a natural number less than N.

In an embodiment of the present disclosure, an operating method of a controller which controls a nonvolatile memory device, the method may include: generating a modified super block including way-interleaving-capable memory blocks and at least one non-way-interleaving-capable memory block; setting memory cells in the way-interleaving-capable memory blocks to store N-bit data; and setting memory cells in the at least one non-way-interleaving-capable memory block to store M-bit data, wherein N is a natural number of 2 or more and M is a natural number less than N.

According to an embodiment of the present disclosure, the performance of a memory system may be improved through effective bad block management.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention are described in greater detail below with reference to the accompanying drawings. However, features and aspects of the present invention may be configured or arranged differently than disclosed herein. Thus, the present invention is not limited to the disclosed embodiments. Rather, the present invention encompasses all modifications and variations of any of the disclosed embodiments that fall within the scope of the claims. Also, throughout the specification, reference to "an embodiment" or the like is not necessarily to only one embodiment, and different references to any such phrase are not necessarily to the same embodiment(s).

It will be understood that when an element or layer is referred to as being "on," "connected to" or "coupled with" another element or layer, it can be directly on, connected or coupled with the other element or layer or one or more intervening elements or layers may be present. It will be further understood that the terms "comprises" and/or "comprising," when used in this specification, do not preclude the existence or addition of other non-stated elements. Similarly, the indefinite articles "a" and "an" indicate one or more, unless stated or the context clearly indicates only one.

Figure 1:
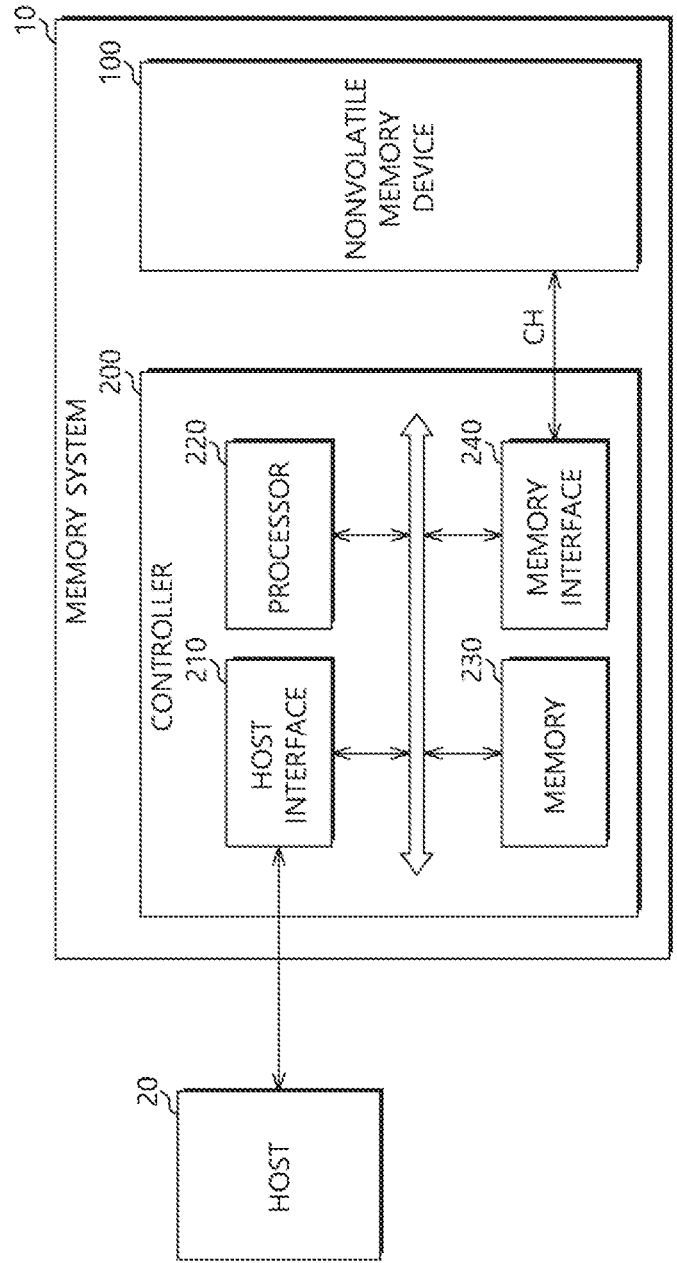
FIG. 1 is a diagram illustrating a configuration of a memory system according to an embodiment of the present disclosure.

FIG. 1 is a diagram illustrating a configuration of a memory system 10 according to an embodiment.

Referring to FIG. 1, the memory system 10 according to an embodiment may store data to be accessed by a host 20 such as a mobile phone, an MP3 player, a laptop computer, a desktop computer, a game player, a television (TV), an in-vehicle infotainment system, and the like.

The memory system 10 may be configured as any of various types of storage devices according to an interface protocol coupled to the host 20. For example, the memory system 10 may be configured as a solid state drive (SSD), a multimedia card in the form of MMC, eMMC, RS-MMC, and micro-MMC, a secure digital card in the form of SD, mini-SD, and micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, and/or a memory stick.

The memory system 10 may be manufactured as any of various types of packages. For example, the memory system 10 may be manufactured as a package on package (POP), a system in package (SIP), a system on chip (SOC), a multi-chip package (MCP), a chip on board (COB), a wafer-level fabricated package (WFP), and/or a wafer-level stack package (WSP).

The memory system 10 may include a nonvolatile memory device 100 and a controller 200.

The nonvolatile memory device 100 may be operated as a storage medium of the memory system 10. The nonvolatile memory device 100 may include any of various types of nonvolatile memory devices according to the type of memory cells therein, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and a resistive random access memory (ReRAM) using a transition metal compound.

Although FIG. 1 shows that the memory system 10 includes one nonvolatile memory device 100, such illustration is for clarity, the memory system 10 may include a plurality of nonvolatile memory devices 100, each of which may be configured and operated consistent with the teachings herein.

The nonvolatile memory device 100, which is described in detail with reference to FIG. 12, may include a memory cell array 110 including a plurality of memory cells MC arranged in regions in which a plurality of word lines WL1 to WLm and a plurality of bit lines BL1 to BLn intersect. The memory cell array 110 may include a plurality of memory blocks, each of which may include a plurality of pages.

For example, each of the memory cells in the memory cell array 110 may be a single-level cell (SLC) in which a single bit data (for example, 1-bit data) is to be stored or a multi-level cell (MLC) in which 2-bit or more data is to be stored. The MLC may store 2-bit data, 3-bit data, 4-bit data, and the like. In a more specific sense, MLC may denote a memory cell in which 2-bit data is to be stored, in which case a memory cell in which 3-bit data is to be stored may be referred to as a triple-level cell (TLC), and a memory cell in which 4-bit data is to be stored may be referred to as a quad-level cell (QLC). However, in the following description, MLC is used in its more general sense to denote a memory cell capable of store 2 or more bits of data.

The memory cell array 110 may include memory cells arranged in a two-dimensional (2D) horizontal structure or memory cells arranged in a 3D vertical structure.

The controller 200 may control overall operation of the memory system 10 through driving of firmware or software loaded into a memory 230. The controller 200 may decode and drive a code-type instruction or algorithm such as firmware or software. The controller 200 may be implemented with hardware or a combination of hardware and software.

The controller 200 may include a host interface 210, a processor 220, the memory 230, and a memory interface 240. Although not shown in FIG. 1, the controller 200 may further include an error correction code (ECC) engine which generates a parity by ECC encoding write data provided from the host 20 and ECC decodes read data read out from the nonvolatile memory device 100 using the parity.

The host interface 210 may perform interfacing between the host 20 and the memory system 10 according to a protocol of the host 20. For example, the host interface 210 may communicate with the host 20 through any of a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and/or a PCI-E protocol.

The processor 220 may be configured as a micro control unit (MCU) and/or a central processing unit (CPU). The processor 220 may process requests transmitted from the host 20. To process requests transmitted from the host 20, the processor 220 may drive a code-type instruction or algorithm (for example, firmware) loaded into the memory 230 and control internal function blocks such as the host interface 210, the memory 230, and the memory interface 240 and the nonvolatile memory device 100.

The processor 220 may generate control signals for controlling operations of the nonvolatile memory device 100 based on the requests transmitted from the host 20 and provide the generated control signals to the nonvolatile memory device 100 through the memory interface 240.

The memory 230 may be configured as a random access memory such as a dynamic random access memory (DRAM) or a static random access memory (SRAM). The memory 230 may store the firmware driven through the processor 220. The memory 230 may also store data (for example, metadata) for driving the firmware. For example, the memory 230 may be operated as a working memory of the processor 220.

The memory 230 may be configured to include a data buffer configured to temporarily store write data to be transmitted to the nonvolatile memory device 100 from the host 20 or read data to be transmitted to the host 20 from the nonvolatile memory device 100. For example, the memory 230 may be operated as a buffer memory of the processor 220. The memory 230 may receive and store map data from the nonvolatile memory device 100 in booting of the memory system 10.

The memory interface 240 may control the nonvolatile memory device 100 according to control of the processor 220. The memory interface 240 may provide control signals to the nonvolatile memory device 100. The control signals may include a command, an address, an operation control signal, and the like for controlling the nonvolatile memory device 100. The memory interface 240 may provide data stored in the data buffer to the nonvolatile memory device 100 or store data transmitted from the nonvolatile memory device 100 in the data buffer.

The controller 200 may further include a map cache (not shown) configured to cache map data referenced by the processor 220 among the map data stored in the memory 230.

Figure 2:
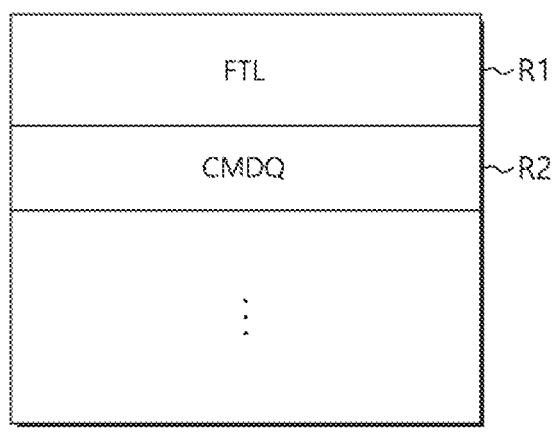
FIG. 2 is a diagram illustrating a configuration of a memory, such as that shown in FIG. 1.

FIG. 2 is a diagram illustrating a configuration of the memory 230 of FIG. 1.

Referring to FIG. 2, the memory 230 may include a first region R1 in which software of a flash translation layer FTL is to be stored, a second region R2 used as a command queue CMDQ for queuing commands and the like corresponding to requests provided from the host 20. The memory 230 may further include, in addition to the regions R1 and R2 illustrated in FIG. 2, other regions used for various purposes such as a region used as a write data buffer in which write data is to be temporarily stored, a region used as a read data buffer in which read data is to be temporarily stored, and a region used as a map cache buffer in which map data is to be cached.

The memory 230 may include a region (not shown) in which system data, metadata, and the like are to be stored. When the nonvolatile memory device 100 is configured as a flash memory device, the processor 220 may control an intrinsic operation of the nonvolatile memory device 100 and drive software called the flash translation layer FTL to provide device compatibility to the host 20. The host 20 may recognize and use the memory system 10 as a general storage device such as a hard disc through the driving of the flash translation layer FTL.

The software of the flash translation layer FTL stored in the first region R1 of the memory 230 may include software for performing various functions and metadata used for the driving the software. The software of the flash translation layer FTL may be stored in a system region (not shown) of the nonvolatile memory device 100 and when the memory system 10 is powered on, the flash translation layer FTL may be read out from the system region of the nonvolatile memory device 100 and loaded into the first region R1 of the memory 230.

Figure 3:
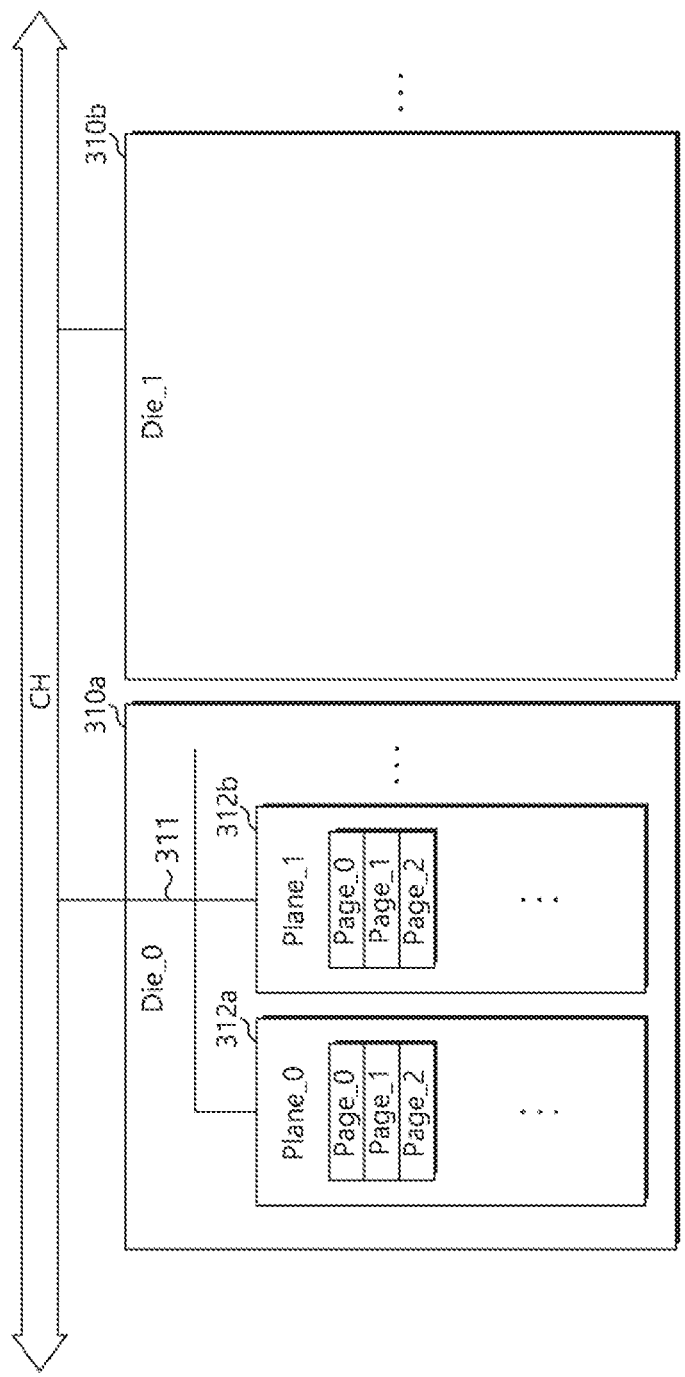
FIG. 3 is a diagram illustrating a data storage region included in a nonvolatile memory device according to an embodiment of the present disclosure.

FIG. 3 is a diagram illustrating a data storage region included in a nonvolatile memory device according to an embodiment.

Referring to FIG. 3, the nonvolatile memory device 100 may include a plurality of dies (Die_0 and Die_1) 310a and 310b which share a channel CH coupled to the controller 200. Each of the dies 310a and 310b may include a plurality of planes (Plane_0 and Plane_1) 312a and 312b which share a way 311 coupled to the channel CH and each of the planes 312a and 312b may include a plurality of data pages Page_0, Page_1, Page_2, . . . . Here, a data page may be a minimum unit of storage for writing or reading data. Further, a plurality of data pages on which an erase operation is collectively performed may be data pages of a block and a plurality of blocks integrally managed may be configured as a super block. The data storage region of the nonvolatile memory device 100 may be a die, a plane, a super block, a block, a data page, and the like, but unless otherwise stated, the data storage region is a page.

The nonvolatile memory device 100 may include spare blocks for replacing memory blocks which cannot be used, for example, memory blocks which are determined as bad blocks. The spare blocks may be located in the plurality of dies 310a and 310b illustrated in FIG. 3 or in a separate die (not shown).

Figure 4:
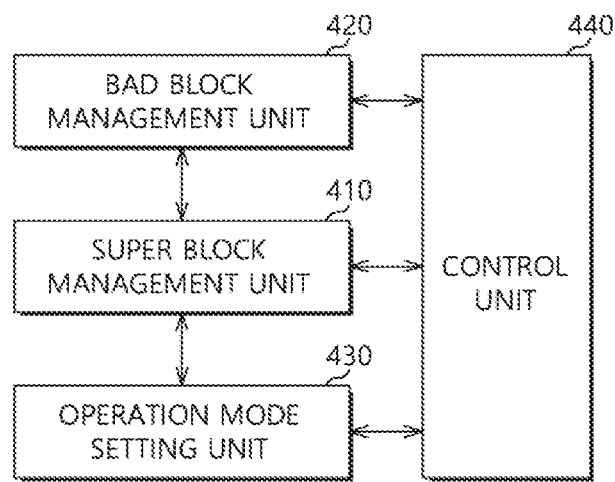
FIG. 4 is a diagram illustrating a flash translation layer (FTL) according to an embodiment of the present disclosure.

FIG. 4 is a block diagram illustrating a flash translation layer (FTL) according to an embodiment.

Referring to FIG. 4, the flash translation layer according to an embodiment may include a super block manager 410, a bad block manager 420, an operation mode setter 430, and a control component 440.

The super block manager 410 may manage the memory blocks in the nonvolatile memory device 100 in groups or units, each including two or more memory blocks. For example, the super block manager 410 may manage the memory blocks in the nonvolatile memory device 100 in units of super blocks, each including a plurality of memory blocks. In this example, the super block manager 410 may allocate memory blocks, on which a write command received from the host 20 is to be performed, to a super block. Here, the number of memory blocks included in a super block may be set during fabrication of the memory system 10, or set or changed later during use of the memory system 10. How many memory blocks are allocated to a particular super block may depend on various design parameters and use requirements of the memory system 10.

In an embodiment, the super block may include a plurality of way-interleaving-capable memory blocks capable of operating according to the way interleaving scheme. For example, the plurality of way-interleaving-capable memory blocks included in the super block may be located in different planes from each other.

In an embodiment, when the memory system 10 includes a plurality of nonvolatile memory devices 100, the super block may be configured of way-interleaving-capable memory blocks in different nonvolatile memory devices 100 or in the same nonvolatile memory device 100.

The bad block manager 420 may detect a bad block among the way-interleaving-capable memory blocks in the nonvolatile memory device 100 and replace the bad block with any one of the spare blocks in the nonvolatile memory device 100.

In an embodiment, the operation of detecting the bad block through the bad block manager 420 may be performed using a background or foreground operation during idle time or command execution. In an embodiment, the bad block manager 420 may detect a bad block based on the number of times a write operation is performed on that memory block. For example, the bad block manager 420 may determine a memory block, on which the number of write operations performed is greater than a threshold write number, as a bad block.

In an embodiment, the bad block manager 420 may detect a bad block based on the number of times an erase operation is performed. For example, the bad block manager 420 may determine a memory block, on which the number of erase operations performed is greater than a threshold erase number, as a bad block.

In an embodiment, the bad block manager 420 may detect a bad block based on an error occurrence frequency. For example, the bad block manager 420 may determine a memory block, which has experienced a frequency of errors in read operations greater than a set threshold frequency, as a bad block.

In an embodiment, the bad block manager 420 may replace a bad block in a super block with a way-interleaving-capable spare block among the spare blocks in the nonvolatile memory device 100. The way-interleaving-capable spare block may be located in the same plane as the bad block or be in a different plane from the normal memory blocks, i.e., memory blocks other than the bad block, within the super block. The way-interleaving-capable spare block that replaces the bad block within the super block may allow the super block to still operate according to the way interleaving scheme.

In an embodiment, when the way-interleaving-capable spare block is not present among the spare blocks in the nonvolatile memory device 100, the bad block manager 420 may generate a modified super block by replacing the bad block in the super block with a non-way-interleaving-capable spare block. The non-way-interleaving-capable spare block may be located in a different plane than the bad block or may be obtained from any plane with normal memory blocks (memory blocks not containing the bad block) in the super block. The non-way-interleaving-capable spare block that replaces the bad block within the modified super block may not allow the modified super block to operate according to the way interleaving scheme.

In accordance with an embodiment of the present disclosure, the non-way-interleaving-capable spare block may be larger in size than the bad block. For example, the size of the non-way-interleaving-capable spare block, which operates in the second mode, may be N/M times the size of the way-interleaving-capable memory block which operates in the first mode, where N is a natural number larger than 2 and M is a natural number less than N. The larger-sized non-way-interleaving-capable spare block may have N/M times more memory cells than the smaller-sized way-interleaving-capable memory block. In accordance with an embodiment of the present disclosure, memory cells in the non-way-interleaving-capable spare block are set to store data represented by a lesser number of bits than memory cells in the way-interleaving-capable memory blocks of the super block (see FIGS. 6A and 6B). For example, when the memory cells in the non-way-interleaving-capable spare block are SLCs and the memory cells in other memory blocks of the super block are TLCs, the number of memory cells in the non-way-interleaving-capable spare block has to be three times greater than the way-interleaving-capable memory blocks of the super block such that the storage capacity of the non-way-interleaving-capable spare block is the same as the way-interleaving-capable memory blocks.

In an embodiment, the operation mode setter 430 may set an operation mode of a way-interleaving-capable memory block, for example, an operation mode of each memory cell in the way-interleaving-capable memory block, to the first mode in which each memory cell stores N-bit data (e.g., N is 3 representing that each memory cell is a TLC). In an embodiment, the operation mode setter 430 may set an operation mode of each memory cell in the non-way-interleaving-capable spare block to the second mode in which each memory cell stores M-bit data (e.g., M is 1 representing that each memory cell is a SLC).

In an embodiment, the number of bits of data to be stored in the memory cell, which operates in the first mode, may be larger than the number of bits of data to be stored in the memory cell which operates in the second mode. For example, the first mode may refer to an operation mode in which a memory cell operates as an MLC and the second mode may refer to an operation mode in which a memory cell operates as a SLC. In another example, the first mode may refer to an operation mode in which a memory cell operates as a TLC and the second mode may refer to an operation mode in which a memory cell operates as a SLC or MLC. In another example, the first mode may refer to an operation mode in which a memory cell operates as a QLC and the second mode may refer to an operation mode in which a memory cell operates as a SLC, MLC, or TLC.

In an embodiment, the operation mode setter 430 may store information of the set operation mode in a flag which stores status information of the memory block. For example, the operation mode setter 430 may store the information of the set operation mode in the flag when the operation mode of the memory cell is set to the second mode.

The control component 440 may control the nonvolatile memory device 100 so that the memory cells included in the super block operate according to the set operation mode. For example, when a write command or a read command is received from the host 20, the control component 440 may control the memory cells of the nonvolatile memory device 100 to perform an operation in response to the write command or read command according to the set first or second mode.

Figure 5:
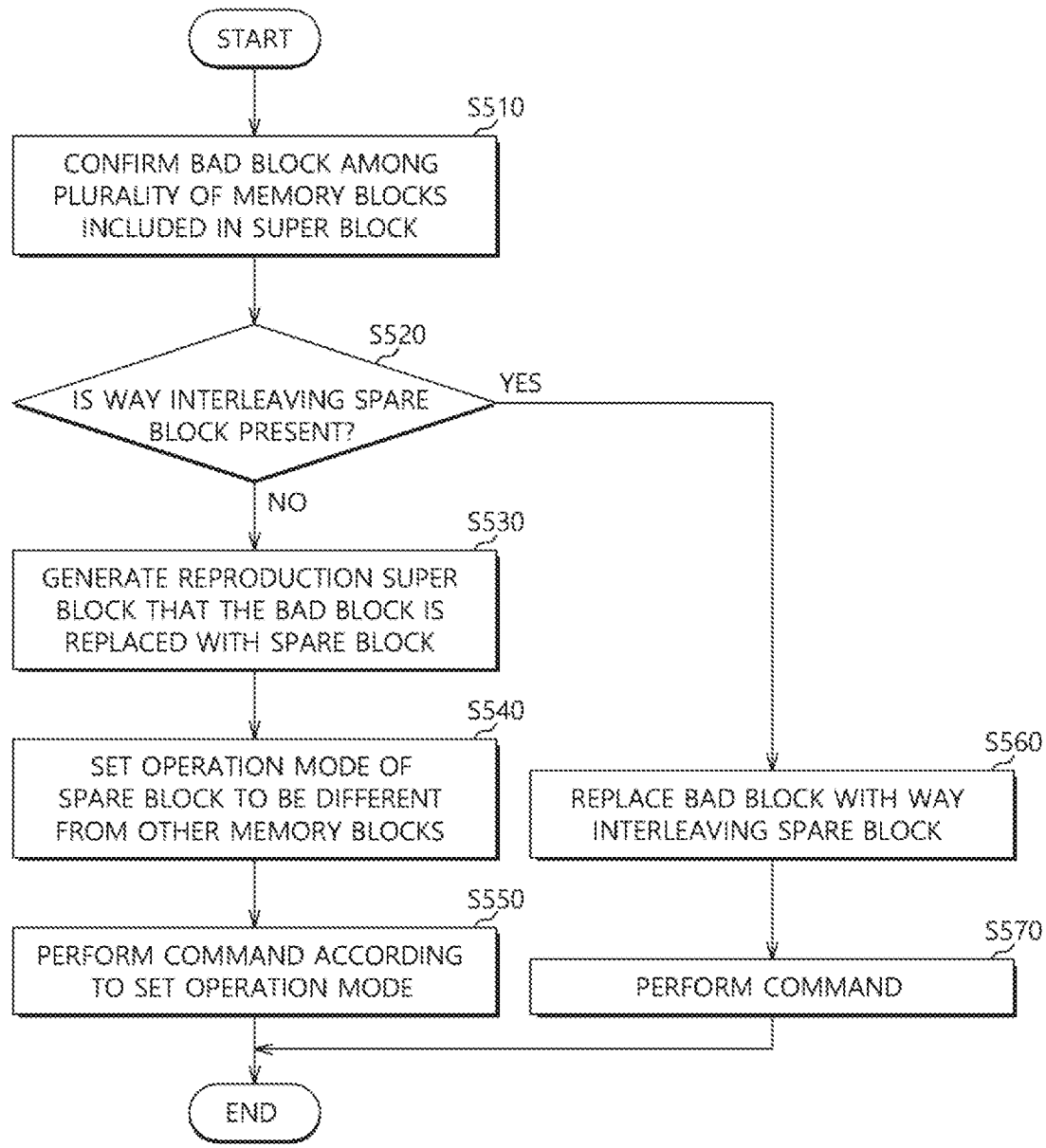
FIG. 5 is a diagram illustrating an operating method of a memory system according to an embodiment of the present disclosure.

FIG. 5 is a diagram illustrating an operating method of a memory system according to an embodiment.

Referring to FIG. 5, in operation S510, the memory system 10 may detect bad blocks among super blocks in the nonvolatile memory device 100. For example, the controller 200 may detect a bad block among a plurality of way-interleaving-capable memory blocks in the super block, based on at least one among the number of times a write operation is performed, the number of times an erase operation is performed, and an error occurrence frequency in read operations.

In operation S520, the memory system 10 may confirm whether or not a way-interleaving-capable spare block is present among the spare blocks to maintain, even when a bad block is replaced in operation S510, a way interleaving function of the super block. For example, the controller 200 may confirm whether or not at least one spare block for replacing the bad block is present in the nonvolatile memory device 100 and confirm whether or not that spare block is a way-interleaving-capable spare block when it is determined that the spare block is present in the nonvolatile memory device 100.

In operation S530, the memory system 10 may replace the bad block with a non-way interleaving-capable spare block when a way interleaving-capable spare block is not present. For example, the controller 200 may generate a modified super block by replacing the bad block in the super block with the non-way interleaving-capable spare block when it is determined that there is no way interleaving-capable spare block in operation S520.

In operation S540, the memory system 10 may set an operation mode of the way-interleaving-capable memory blocks and the non-way-interleaving-capable spare block in the nonvolatile memory device 100 to the first mode or the second mode.

In an embodiment, the controller 200 may set the operation modes of the way-interleaving-capable memory blocks in the modified super block to the first mode and set the operation mode of the non-way-interleaving-capable spare block, with which the bad block is replaced, to the second mode.

In an embodiment, the controller 200 may reflect the set operation modes of the non-way-interleaving-capable spare block and the way-interleaving-capable memory blocks in the modified super block in the flag information for the memory blocks.

In operation S550, the memory system 10 may execute a command of the host 20 according to the set operation mode. For example, the controller 200 may control the nonvolatile memory device 100 to perform, in response to a write command or a read command received from the host 20, an operation on the non-way-interleaving-capable spare block and the way-interleaving-capable memory blocks in the modified super block according to the operation mode information included in the flag information.

In operation S560, the memory system 10 may replace the bad block in the super block with a way-interleaving-capable spare block when it is determined that such block is present, for example, when it is determined that the at least one spare block is the way interleaving-capable spare block in operation S520.

In operation S570, the memory system 10 may perform, in response to the write command or the read command received from the host 20, an operation on the super block according to the way interleaving scheme.

Figure 6A:
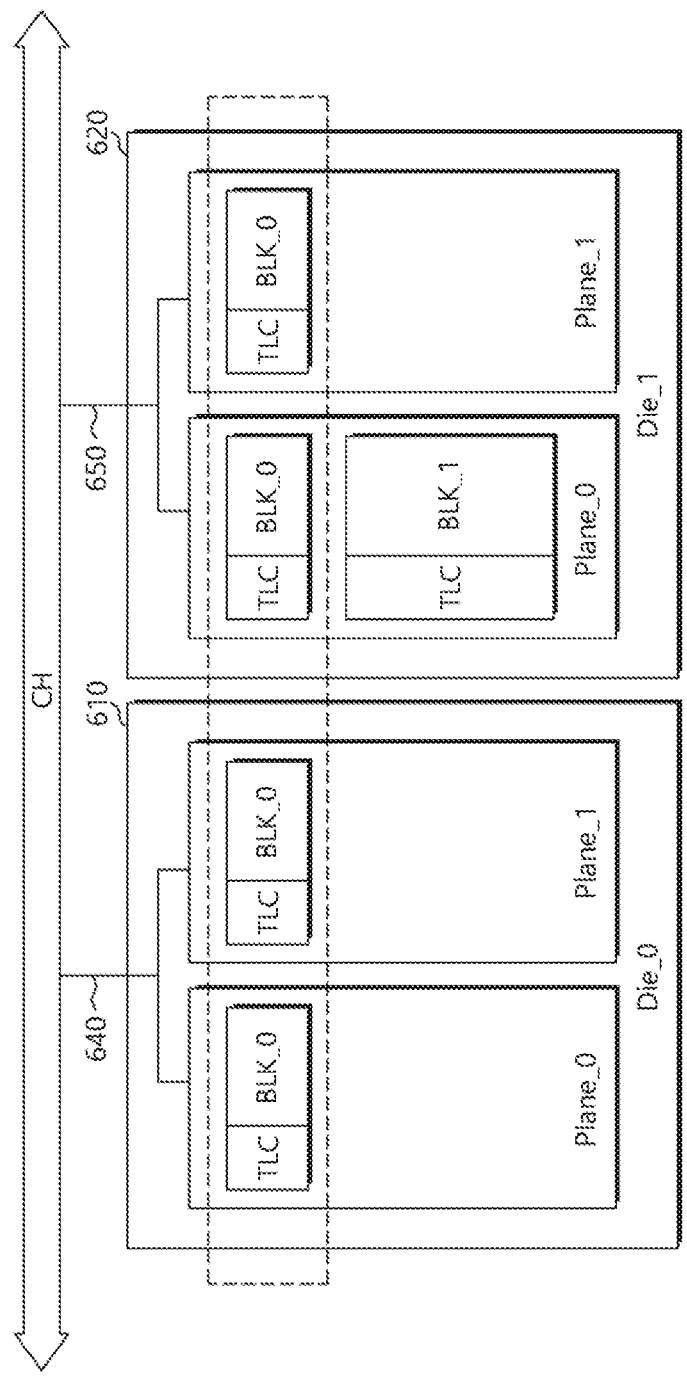
FIGS. 6A and 6B are diagrams illustrating an operation of a memory system according to an embodiment of the present disclosure.
Figure 6B:
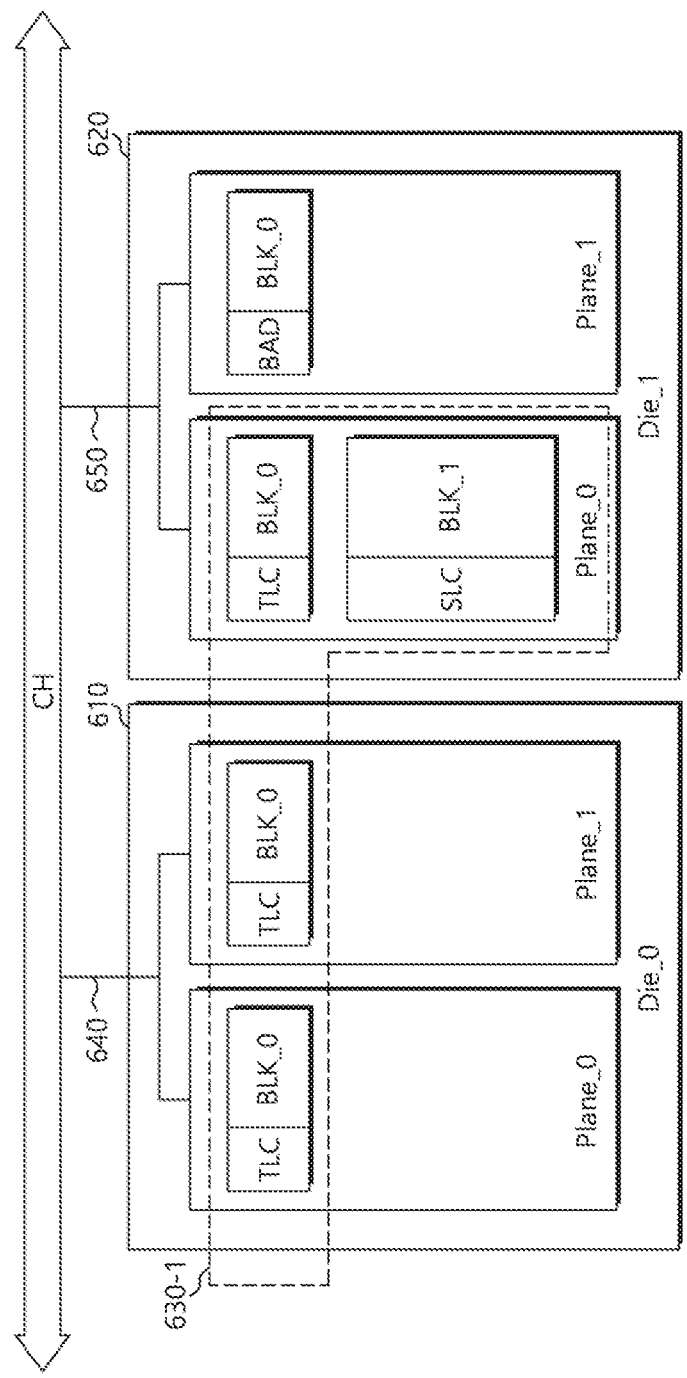

FIGS. 6A and 6B are diagrams illustrating an operation of the memory system according to an embodiment.

Referring to FIG. 6A, dies (Die_0 and Die_1) 610 and 620 may be coupled to a channel CH through ways 640 and 650. Each of the dies 610 and 620 may include a plurality of planes, e.g, Plane_0 and Plane_1. The controller 200 may manage way-interleaving-capable memory blocks BLK_0 in each of four planes, e.g., Plane_0 and Plane_1 of Die_0 and Plane_0 and Plane_1 of Die_1, as a single group which is a super block 630. Since the four memory blocks BLK0 in the super block 630 are each located in different planes, the way-interleaving-capable memory blocks BLK_0 may operate according to the way interleaving scheme. The way-interleaving-capable memory blocks BLK_0 in the super block 630 may be set to operate as TLC memory blocks.

Referring to FIG. 6B, the memory block BLK_0 in Plane_1 of Die_1 may be determined to be a bad block and a modified super block 630-1 may be generated by replacing that bad block with a non-way-interleaving-capable spare block, e.g., BLK_1 in Plane_0 of Die_1. Since the non-way-interleaving-capable spare block BLK_1 is located in the same plane as the way-interleaving-capable memory block BLK_0 of Plane_0 of Die_1 within the modified super block 630-1, the non-way-interleaving-capable spare block BLK_1 may not allow the modified super block 630-1 to operate according to the way interleaving scheme.

The controller 200 may set the non-way-interleaving-capable spare block BLK_1 to operate as a SLC memory block. The performance of the memory system 10 may be degraded since it is impossible for the modified super block 630-1 to operate according to the way interleaving scheme due to the non-way-interleaving-capable spare block BLK_1. However, in an embodiment, the non-way-interleaving-capable spare block BLK_1 of Plane_0 in Die_1 in the modified super block 630-1 may operate as a SLC memory block, an operation speed of which is relatively fast as compared with a TLC. The way-interleaving-capable memory blocks, which are the memory blocks BLK_0 of Plane_0 and Plane_1 in Die_0 and BLK_0 of Plane_0 in Die_1 in the modified super block 630-1, may operate as TLC memory blocks. The size (i.e., the number of memory cells) of the non-way-interleaving-capable spare block is three times greater than the size (i.e., the number of memory cells) of each of the way-interleaving-capable memory blocks within the modified super block 630-1. Accordingly, performance degradation due to non-way interleaving may be alleviated.

Figure 7:
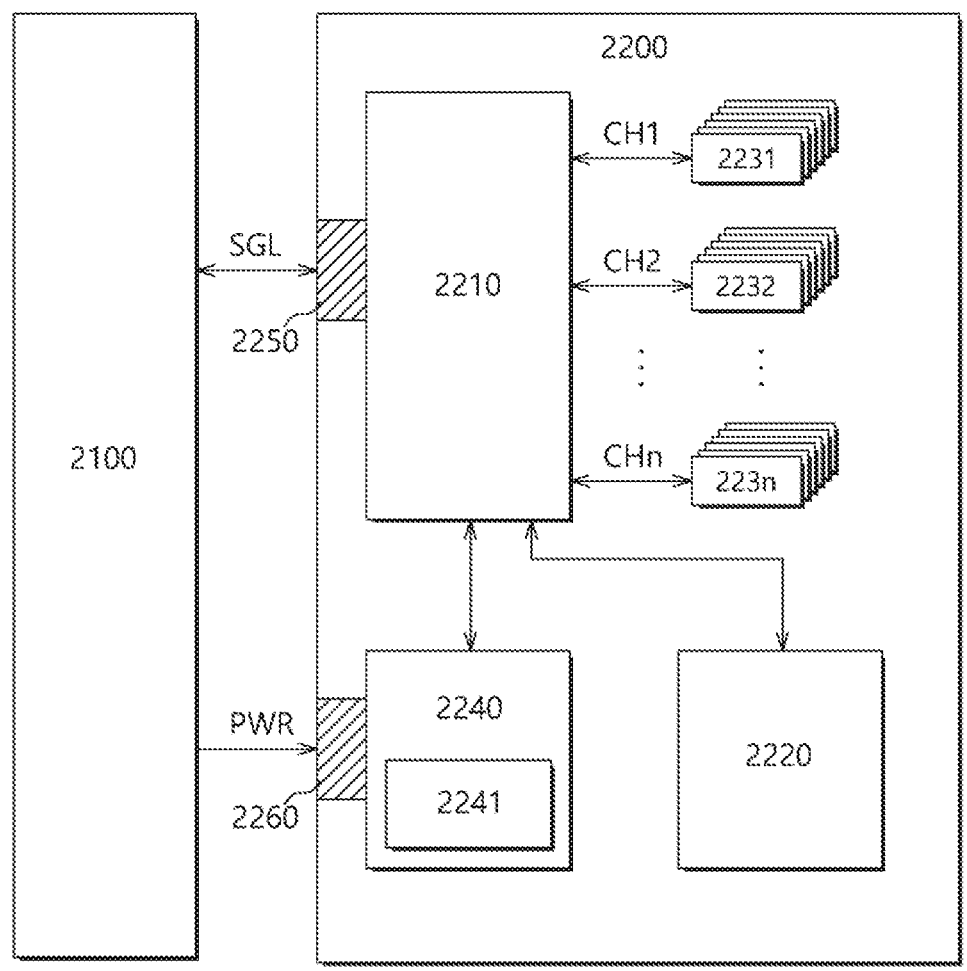
FIG. 7 is a diagram illustrating a data processing system including a solid state drive (SSD) according to an embodiment of the present disclosure.

FIG. 7 is a block diagram illustrating a data processing system including a solid state drive (SSD) according to an embodiment. Referring to FIG. 7, a data processing system 2000 may include a host 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2200.

The buffer memory device 2220 may temporarily store data which are to be stored in the nonvolatile memory devices 2231 to 223n. Further, the buffer memory device 2220 may temporarily store data which are read out from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to the same channel may be coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be properly terminated when sudden power-off (SPO) occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured as any of various types of connectors according to an interface scheme between the host 2100 and the SSD 2200.

Figure 8:
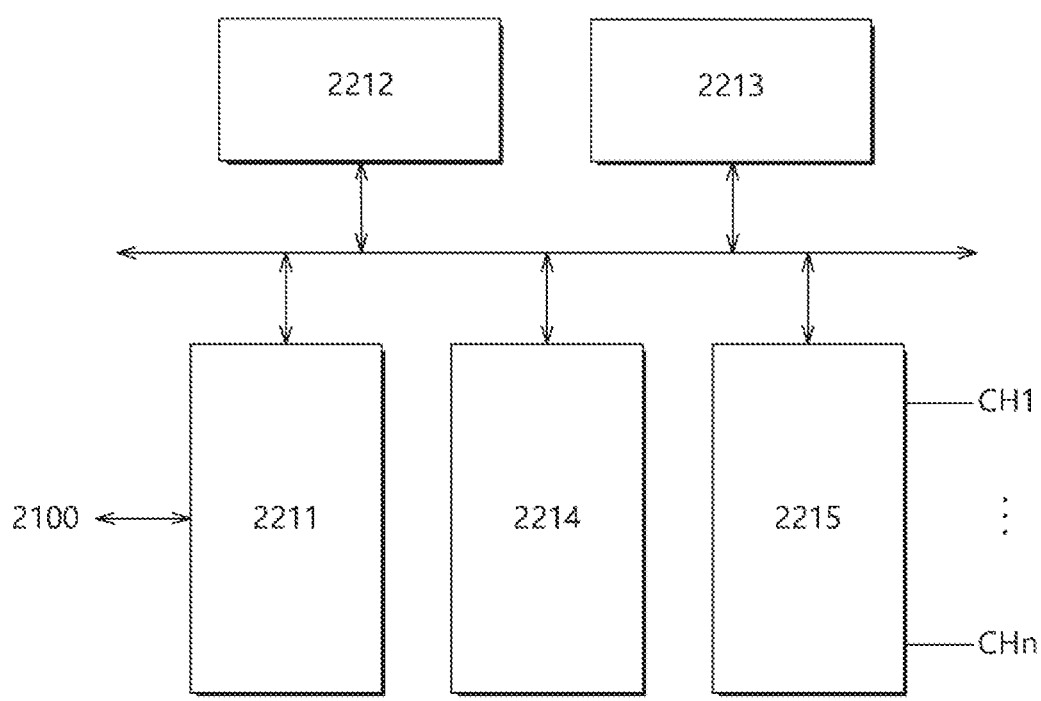
FIG. 8 is a diagram illustrating a configuration of a controller, such as that in FIG. 7.

FIG. 8 is a block diagram illustrating the controller illustrated in FIG. 7. Referring to FIG. 8, the controller 2210 may include a host interface 2211, a control component 2212, a random access memory 2213, an error correction code (ECC) component 2214, and a memory interface 2215.

The host interface 2211 may provide interfacing between the host 2100 and the SSD 2200 according to a protocol of the host 2100. For example, the host interface 2211 may communicate with the host 2100 through any of SD, USB, MMC, embedded MMC (eMMC), PCMCIA, PATA, SATA, SCSI, SAS, PCI, PCI-E, and UFS protocols. In addition, the host interface 2211 may perform a disk emulating function of supporting the host 2100 to recognize the SSD 2200 as a general-purpose memory system 10, for example, a hard disk drive (HDD).

The control component 2212 may analyze and process the signal SGL inputted from the host 2100. The control component 2212 may control operations of internal function blocks according to firmware or software for driving the SSD 2200. The random access memory 2213 may be used as a working memory for driving such firmware or software.

The ECC component 2214 may generate parity data of data to be transmitted to the nonvolatile memory devices 2231 to 223n. The generated parity data may be stored, along with the data, in the nonvolatile memory devices 2231 to 223n. The ECC component 2214 may detect errors of data read out from the nonvolatile memory devices 2231 to 223n based on the parity data. When the detected errors are within a correctable range, the ECC component 2214 may correct the detected errors.

The memory interface 2215 may provide control signals such as commands and addresses to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read out from the nonvolatile memory devices 2231 to 223n to the buffer memory device 2220.

Figure 9:
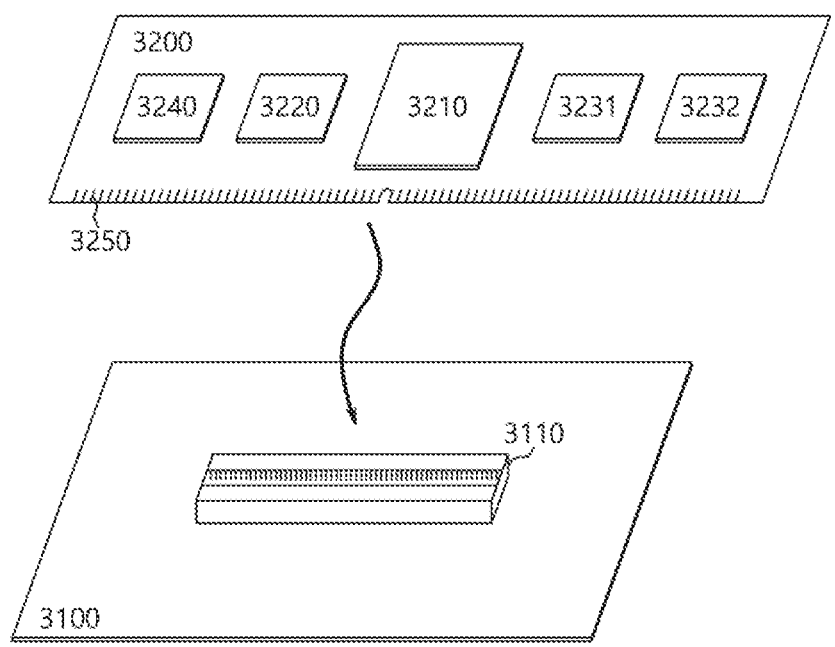
FIG. 9 is a diagram illustrating a data processing system including a memory system according to an embodiment of the present disclosure.

FIG. 9 is a diagram illustrating a data processing system including a memory system according to an embodiment. Referring to FIG. 9, a data processing system 3000 may include a host 3100 and a memory system 3200.

The host 3100 may be configured in the form of a board such as a printed circuit board. Although not shown in FIG. 9, the host 3100 may include internal function blocks for performing functions of the host.

The host 3100 may include a connection terminal 3110 such as a socket, a slot, or a connector. The memory system 3200 may be mounted on the connection terminal 3110.

The memory system 3200 may be configured in the form of a board such as a printed circuit board. The memory system 3200 may refer to a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control overall operation of the memory system 3200. The controller 3210 may be configured in the same manner as the controller 2210 shown in FIG. 8.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host 3100. Through the connection terminal 3250, signals such as commands, addresses, data and the like and power may be transferred between the host 3100 and the memory system 3200. The connection terminal 3250 may be configured as any of various types depending on an interface scheme between the host 3100 and the memory system 3200. The connection terminal 3250 may be disposed on or in any side of the memory system 3200.

Figure 10:
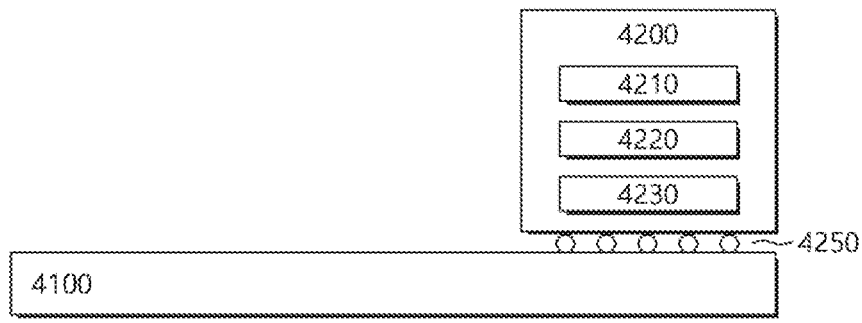
FIG. 10 is a diagram illustrating a data processing system including a memory system according to an embodiment of the present disclosure.

FIG. 10 is a block diagram illustrating a data processing system including a memory system according to an embodiment. Referring to FIG. 10, a data processing system 4000 may include a host 4100 and a memory system 4200.

The host 4100 may be configured in the form of a board such as a printed circuit board. Although not shown in FIG. 10, the host 4100 may include internal function blocks for performing functions of the host.

The memory system 4200 may be configured in the form of a surface-mounting type package. The memory system 4200 may be mounted on the host 4100 through solder balls 4250. The memory system 4200 may include a controller 4210, a buffer memory device 4220, and a nonvolatile memory device 4230.

The controller 4210 may control overall operation of the memory system 4200. The controller 4210 may be configured in the same manner as the controller 2210 shown in FIG. 8.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host 4100 or the nonvolatile memory device 4230 according to control of the controller 4210.

The nonvolatile memory device 4230 may be used as a storage medium of the memory system 4200.

Figure 11:
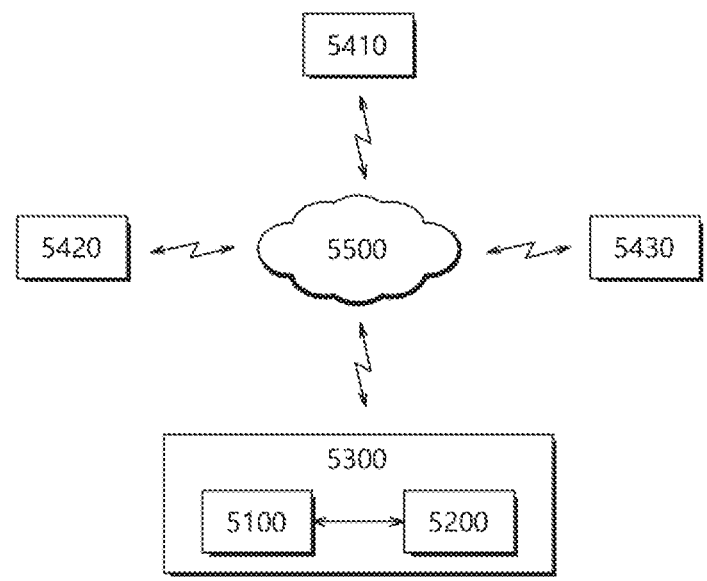
FIG. 11 is a diagram illustrating a network system including a memory system according to an embodiment of the present disclosure.

FIG. 11 is a diagram illustrating a network system 5000 including a memory system according to an embodiment. Referring to FIG. 11, the network system 5000 may include a server system 5300 and a plurality of client systems 5410 to 5430 which are coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a memory system 5200. The memory system 5200 may be configured as the memory system 10 illustrated in FIG. 1, the memory system 2200 illustrated in FIG. 7, the memory system 3200 illustrated in FIG. 9, or the memory system 4200 illustrated in FIG. 10.

Figure 12:
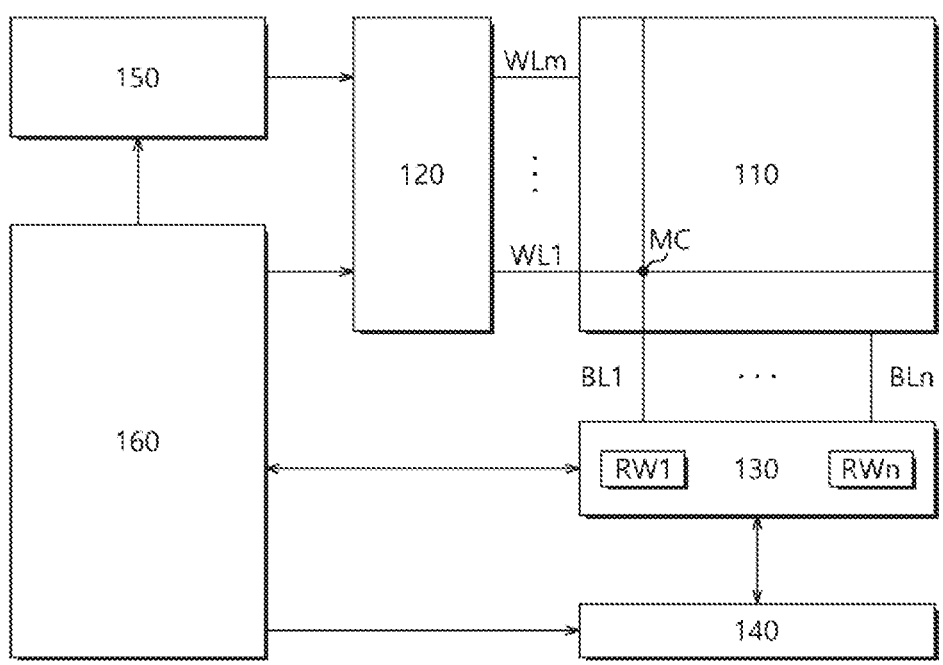
FIG. 12 is a diagram illustrating a nonvolatile memory device included in a memory system according to an embodiment of the present disclosure.

FIG. 12 is a block diagram illustrating a nonvolatile memory device included in a memory system according to an embodiment. Referring to FIG. 12, the nonvolatile memory device 100 may include the memory cell array 110, a row decoder 120, a data read/write block 130, a column decoder 140, a voltage generator 150, and control logic 160.

The memory cell array 110 may include the memory cells MC which are arranged in regions where the word lines WL1 to WLm and the bit lines BL1 to BLn cross each other.

The row decoder 120 may be coupled with the memory cell array 110 through the word lines WL1 to WLm. The row decoder 120 may operate according to control of the control logic 160. The row decoder 120 may decode addresses provided from an external device (not shown). The row decoder 120 may select and drive the word lines WL1 to WLm, based on the decoding results. For example, the row decoder 120 may provide word line voltages provided from the voltage generator 150, to the word lines WL1 to WLm.

The data read/write block 130 may be coupled with the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as a write driver which stores data provided from the external device, in the memory cell array 110 in a write operation. In another example, the data read/write block 130 may operate as a sense amplifier which reads out data from the memory cell array 110 in a read operation.

The column decoder 140 may operate according to control of the control logic 160. The column decoder 140 may decode addresses provided from the external device. The column decoder 140 may couple data input/output lines (or data input/output buffers) with the read/write circuits RW1 to RWn of the data read/write block 130 which respectively correspond to the bit lines BL1 to BLn, based on decoding results.

The voltage generator 150 may generate voltages to be used in internal operations of the nonvolatile memory device 100. The voltages generated by the voltage generator 150 may be applied to the memory cells MC of the memory cell array 110. For example, a program voltage generated in a program operation may be applied to a word line of memory cells on which the program operation is to be performed. In another example, an erase voltage generated in an erase operation may be applied to a well region of memory cells on which the erase operation is to be performed. In still another example, a read voltage generated in a read operation may be applied to a word line of memory cells on which the read operation is to be performed.

The control logic 160 may control overall operation of the nonvolatile memory device 100, based on control signals provided from the external device. For example, the control logic 160 may control operations of the nonvolatile memory device 100 such as read, write, and erase operations of the nonvolatile memory device 100.

The above described embodiments of the present invention are intended to illustrate, not limit the present invention. Various alternatives and equivalents are possible, as those skilled in the art will appreciate in light of the present disclosure. The invention is not limited by or to any of the embodiments described herein. Nor is the invention limited to any specific type of semiconductor device. Rather, the present invention encompasses all variations and modifications that fall within the scope of the appended claims.

What is claimed is:

1. A memory system comprising:
at least one nonvolatile memory device; and
a controller configured to control the at least one nonvolatile memory device,
wherein the at least one nonvolatile memory device includes at least one super block including a plurality of way-interleaving-capable memory blocks,
wherein each of memory cells in the plurality of way-interleaving-capable memory blocks operates in a first mode to store N-bit data, and
wherein the controller generates a modified super block by replacing at least one bad block among the plurality of way-interleaving-capable memory blocks in the at least one super block with a spare block, sets each of memory cells in the spare block to operate in a second mode to store M-bit data while setting each of memory cells in way-interleaving-capable memory blocks except the spare block in the modified super block to operate in the first mode when the spare block is a non-way-interleaving-capable spare block, and sets each of memory cells in the spare block and the way-interleaving-capable memory blocks in the modified super block to operate in the first mode when the spare block is a way-interleaving-capable spare block,
wherein N is a natural number of 2 or more and M is a natural number less than N.

2. The memory system of claim 1, wherein the plurality of way-interleaving-capable memory blocks in the super block are included in the same nonvolatile memory device.

3. The memory system of claim 1, wherein the plurality of way-interleaving-capable memory blocks in the super block are included in different nonvolatile memory devices, respectively.

4. The memory system of claim 1, wherein the controller generates the modified super block when a way-interleaving-capable spare block is not present in the at least one nonvolatile memory device.

5. The memory system of claim 1, wherein the non-way-interleaving-capable spare block having memory cells set to operate in the second mode stores data having N/M times a data size to be stored in the way-interleaving-capable memory blocks having memory cells which operate in the first mode.

6. The memory system of claim 1, wherein the controller stores information of a set operation mode in flags of memory blocks in the modified super block.

7. The memory system of claim 6, wherein the controller controls the nonvolatile memory device such that the memory blocks in the modified super block operate in the first mode or the second mode based on the flags in performing a command received from a host.

8. The memory system of claim 1,
wherein, in the first mode, each of the memory cells in the plurality of way-interleaving-capable memory blocks operates as any of a multi-level cell (MLC), a triple-level cell (TLC), and a quad-level cell (QLC), and
wherein, in the second mode, each of the memory cells in the non-way-interleaving-capable spare block operates as any of a single-level cell (SLC), the MLC, and the TLC.

9. The memory system of claim 1, wherein the plurality of way-interleaving-capable memory blocks in the super block are included in different planes, respectively, and simultaneously accessed.

10. An operating method of a memory system which includes at least one nonvolatile memory device and a controller configured to control the at least one nonvolatile memory device, the method comprising:
detecting, by the controller, at least one bad block in at least one super block including a plurality of way-interleaving-capable memory blocks;

generating, by the controller, a modified super block by replacing the at least one bad block with a spare block;

setting each of memory cells in way-interleaving-capable memory blocks except the spare block in the modified super block to operate in a first mode to store N-bit data, and setting each of memory cells in the spare block in the modified super block to operate in a second mode to store M-bit data when the spare block is a non-way-interleaving-capable spare block; and setting each of memory cells in the spare block and the way-interleaving-capable memory blocks in the modified super block to operate in the first mode when the spare block is a way-interleaving-capable spare block, wherein N is a natural number of 2 or more and M is a natural number less than N.

11. The method of claim 10, wherein the plurality of way-interleaving-capable memory blocks in the super block are included in the same nonvolatile memory device.

12. The method of claim 10, wherein the plurality of way-interleaving-capable memory blocks in the super block are included in different nonvolatile memory devices, respectively.

13. The method of claim 10, wherein the generating of the modified super block includes generating the modified super block when a way-interleaving-capable spare block is not present in the at least one nonvolatile memory device.

14. The method of claim 10, wherein the setting of the memory cells in the non-way-interleaving-capable spare block to operate in the second mode includes storing information of a set operation mode in flags of memory blocks in the modified super block.

15. The method of claim 14, further comprising controlling the nonvolatile memory device such that the memory blocks in the modified super block operate in the first mode or the second mode based on the flags in performing a command received from a host.

16. The method of claim 10,
wherein, in the first mode, each of the memory cells in the plurality of way-interleaving-capable memory blocks operates as any of a multi-level cell (MLC), a triple-level cell (TLC), and a quad-level cell (QLC), and wherein, in the second mode, each of the memory cells in the non-way-interleaving-capable spare block operates as any of a single-level cell (SLC), the MLC, and the TLC.

17. The method of claim 10, wherein the plurality of way-interleaving-capable memory blocks included in the super block are included in different planes, respectively, and simultaneously accessed.

18. A memory system comprising:
a nonvolatile memory device including a non-way-interleaving-capable spare block, a way-interleaving-capable spare block, and a super block having plural way-interleaving-capable memory blocks; and a controller configured to:
modify the super block by replacing a bad block therein with a spare block to generate a modified super block; and control the nonvolatile storage device to perform an operation on the modified super block, wherein each memory cell within the way-interleaving-capable memory block in the modified super block is capable of storing N-bit data and each cell within the spare block in the modified super block is capable of storing M-bit data when the spare block is the non-way-interleaving-capable spare block, where N and M are each natural numbers and M is less than N;

wherein each memory cell within the way-interleaving-capable memory block and the spare block in the modified super block is capable of storing N-bit data when the spare block is the way-interleaving-capable spare block; and wherein a number of memory cells within the non-way-interleaving-capable spare block is N/M times greater than a number of memory cells within one of the plural way-interleaving-capable memory blocks.

* * * * *